United States Patent [19]

Okada et al.

[11] Patent Number: 4,940,753
[45] Date of Patent: Jul. 10, 1990

[54] POLYPHENYLENE ETHER RESIN COMPOSITION

[75] Inventors: Ken-ichi Okada; Hideo Kasahara, both of Yokosuka, Japan

[73] Assignee: Asahi Kasei Kogyo Kabushiki Kaisha, Osaka, Japan

[21] Appl. No.: 849,792

[22] Filed: Apr. 9, 1986

[30] Foreign Application Priority Data

Apr. 19, 1985 [JP] Japan ................... 60-82193

[51] Int. Cl.$^5$ ............................ C08L 71/04
[52] U.S. Cl. ................... 525/68; 525/132; 525/152; 525/905
[58] Field of Search ............ 525/132, 152, 905, 68

[56] References Cited

U.S. PATENT DOCUMENTS 4,128,602 12/1978 Katchman et al. .
4,436,854 3/1984 Brandstetter et al. .

FOREIGN PATENT DOCUMENTS 223850 8/1985 Japan .

Primary Examiner—Jacob Ziegler
Attorney, Agent, or Firm—Birch, Stewart, Kolasch & Birch

[57] ABSTRACT

A polyphenylene ether resin composition comprising a polyphenylene ether resin and a rubber-reinforced styrenic resin, said composition containing rubber particles dispersed therein, which particles having a distribution of sizes such that there are at least one maximal value at $1.5\mu$ or less and at least one maximal value at 2 to $3\mu$ in volume fraction of the sizes, with the ratio of the former maximal value to the latter maximal value being within the range of from ¼ to 4/1, and substantially no rubber particles having a size of $3\mu$ or larger exist. The composition can be used widely for uses such as industrial parts, electrical parts, office instrument housing, automobile parts, precision parts, etc.

17 Claims, No Drawings

POLYPHENYLENE ETHER RESIN COMPOSITION

TECHNICAL FIELD

The present invention relates to a composition comprising a polyphenylene ether resin and a rubber-reinforced styrenic resin.

BACKGROUND ART

Heretofore, resin compositions comprising polyphenylene ether resins and rubber-reinforced styrenic resins have been used widely for uses such as industrial parts, electrical parts, office instrument housing, automobile parts, precision parts, etc., by utilizing various characteristics such as moldability, workability, heat resistance, impact resistance, flame retardancy, electrical characteristics and others, and their amounts used are markedly increasing in recent years. With such an increase of the amount used, improvements of the resin characteristics are strongly desired.

For instance, in a molded product having a large scale and a complicated structure, it is required to have high impact strength at the position where molding strain tends to remain, high impact strength at the broad flat portion and uniform luster over the whole of the molded product. Further, some molded products may have metals inserted therein, whereby crack resistance is greatly demanded. Furthermore, there is an increasing tendency to employ an injection molding system by a pin gate or hot runner with an aim to make the design of the molded product higher or power saving, and for this purpose it is also required to generate no silver streaks under high temperature. That is, to comply with diversification of uses in the future, it is indispensable that the overall balance of all the characteristics should be good. However, such a requirement cannot at all be accomplished in the conventional resin compositions comprising polyphenylene ether resins and rubber-reinforced styrenic resins. To cope with such problems, the following techniques have been proposed.

In a resin composition comprising a polyphenylene ether resin and a rubber-reinforced styrenic resin, as can be seen in U.S. Pat. No. 4,128,602, when the rubber particle size is merely made smaller, dart impact strength and crack resistance are inferior, although Izod impact strength and luster are excellent. On the contrary, when the rubber particle size is made greater, Izod impact strength and luster are inferior, although dart impact strength and crack resistance are good. Also, according to experiences, when there exists a rubber having large particle sizes, the generation of silver streaks has been the problem. On the other hand, as can be seen in U.S. Pat. No. 4,436,854, by merely making rubber particles having small particle sizes and rubber particles having large particle sizes to exist, the balance of the practical characteristics such as impact strength, luster, crack resistance cannot be satisfactorily maintained, and further it is entirely impossible to cancel the generation of silver streaks having the greatest effect on the commercial value of the molded products. For, by the presence of rubber particles with large particle sizes, although dart impact strength and crack resistance can be improved, silver streaks will be generated for some unclarified reason and this can be by no means disregarded.

However, the present inventors have made various investigations by changing various factors concerning the compositions comprising polyphenylene ether resins and rubber-reinforced styrenic resins, and consequently the above-described problems have been completely solved by the present invention.

DISCLOSURE

The present invention provides a polyphenylene ether resin composition, comprising a polyphenylene ether resin and a rubber-reinforced styrenic resin, said composition containing rubber particles dispersed therein, which particles having a distribution of sizes such that there are at least one maximal value at 1.5 $\mu$ or less and at least one maximal value at 2 to 3 $\mu$ in volume fraction of the sizes, with the ratio of the former maximal value to the latter maximal value being within the range of from $\frac{1}{4}$ to 4/1, and substantially no rubber particles having a size of 3 $\mu$ or larger exist.

The polyphenylene ether resin as described in the present invention is generally a homopolymer consisting as its constituent unit of the formula [I] shown below or a copolymer consisting of the units [I] and of the units of the formula [II] shown below.

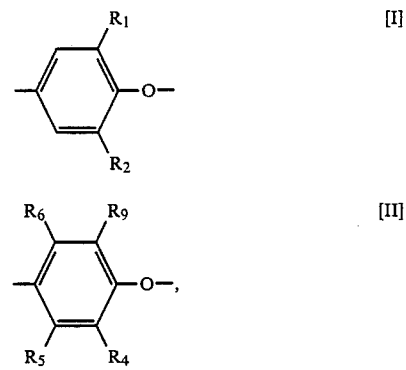

wherein $R_1$, $R_2$, $R_3$, $R_4$, $R_5$ and $R_6$ may be either identical or different and represent mono-valent residues selected from the group consisting of alkyl groups having to 4 carbon atoms except for tert-butyl group, aryl groups, hydroxyalkyl groups, haloalkyl groups, halogen atoms and hydrogen atom, but $R_5$ and $R_6$ are not hydrogen atoms at the same time.

Here, the above-described copolymer comprises 90 parts by weight to less than 100 parts by weight of [I] and up to 10 parts by weight of [II]. If [II] is in excess of 10 parts by weight, heat resistance can be improved but workability becomes inappropriately poor.

Typical examples of homopolymers of polyphenylene ether include poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloro-1,4-phenylene)ether, poly(2-methyl-6-hydroxyethyl-1,4-phenylene)ether and poly(2-methyl-6-chloroethyl-1,4-phenylene)ether.

The polyphenylene ether copolymer is composed mainly of a copolymer structure obtained by copolymerization of nucleus-substituted phenols respectively represented by the formulae

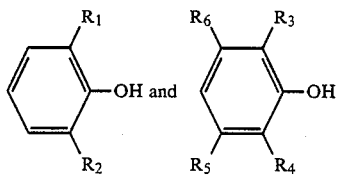

wherein $R_1$, $R_2$, $R_3$, $R_4$, $R_5$ and $R_6$ may be either identical or different and represent mono-valent residues selected from the group consisting of alkyl groups having 1 to 4 carbon atoms except for tert-butyl group, aryl groups, hydroxyalkyl groups, haloalkyl groups, halogen atoms and hydrogen atom, but $R_5$ and $R_6$ are not hydrogen atoms at the same time.

Such copolymers may include, for example, copolymers of 2,6-dimethylphenol and 2,3-dimethyl-6-ethylphenol, 2-methyl-6-ethylphenol and 2,3-dimethyl-6-ethylphenol, 2,6-diethylphenol and 2,3-dimethyl-6-ethylphenol, 2,6-dimethylphenol and 2,3,6-trimethylphenol, 2-methyl-6-ethylphenol and 2,3,6-trimethylphenol, 2,6-diethylphenol and 2,3,6-trimethylphenol, and 2-methyl-6-chloromethylphenol and 2,3,6-trimethylphenol.

Among them the most preferred is a poly(2,6-dimethyl-1,4-phenylene)ether.

Further, the composition of the present invention also includes the use of the above polyphenylene ether having styrene and/or a monomer copolymerized therewith graft-copolymerized thereon.

Examples of monomers copolymerized with styrene include α-methylstyrene, methylstyrene, dimethylstyrene, vinyltoluene, acrylonitrile, methacrylonitrile, acrylic acid, methacrylic acid, and esters of methacrylic acid.

The means for grafting these monomers onto a polyphenylene ether is not particularly limited, but, for example, it is possible to use the methods as proposed in Japanese Patent Publication Examined No. 30991/1977, U.S. Pat. No. 3,929,930 and U.S. Pat. No. 4,097,556, namely the methods in which styrene and/or the abovedescribed monomers are grafted during heating to the polyphenylene ether in the presence of a peroxide.

The most preferable graft copolymer is a styrene-grafted poly(2,6-dimethyl-1,4-phenylene)ether.

The intrinsic viscosity [η] of the polyphenylene ether extracted from the composition of the present invention was measured by using a Ubbelohde type viscometer at 30° C. in chloroform as the solvent.

In the present invention, in the case when the polyphenylene ether is a 2,6-dimethyl-1,4-phenylene ether, it can be extracted according to the method as described below to determine its intrinsic viscosity.

In 200 ml of chloroform, 6 g of the composition according to Example or Comparative Example of the present application is added, and after shaking at room temperature for 3 hours, the mixture was subjected to centrifugation at 52,000 G for 45 minutes to separate insolubles from the solution portion. The solution portion is added dropwise carefully into a stirred methanol of 1,000 cc to effect reprecipitation. Then, the precipitate is filtered by using a glass filter of G4 mesh and washed on a filter by pouring 1,000 ml of methanol. Thereafter, the filtered product is taken out and dried at reduced pressure in a nitrogen atmosphere at 145° C. for 1 hour to provide Sample 1. In this case, the solvent or non-solvent can be selected suitably depending on the properties of the rubber-reinforced styrenic resin and the additives.

The Sample 1 is dissolved in dichloromethane at 35° C. so that the concentration of the poly(2,6-dimethyl1,4-phenylene)ether may become 5 weight % from its content as determined by the IR-spectrum method. Then, the said solution is left to stand at −5° C. for 24 hours to precipitate the poly(2,6-dimethyl-1,4-phenylene)ether component. Thereafter, said component is filtered by using a glass filter of G4 mesh and similarly washed on a glass filter at −5° C. by pouring sufficient amount of dichloromethane, followed by drying of said filtered product at reduced pressure in a nitrogen atmosphere at 145° C. for 30 minutes to provide Sample 2.

The intrinsic viscosity [η] of the Sample 2 is determined by using of a Ubbelohde type viscometer at 30° C. in chloroform as the solvent to determine the intrinsic viscosity [η] of the poly(2,6-dimethyl-1,4-phenylene)ether which is the constituent of the resin composition.

In the case of other polyphenylene ether resins, the intrinsic viscosities can be determined according to the same measuring method.

If the intrinsic viscosity [η] of the polyphenylene ether resin measured in chloroform is less than 0.50, crack resistance will undesirably be lowered. On the contrary, if an intrinsic viscosity [η] exceeds 2.0, workability becomes unpractically poor. Particularly, in the case of poly(2,6-dimethyl-phenylene)ether, workability will be markedly lowered to become poorly applicable in practice, if the intrinsic viscosity [η] is over 1.0, and therefore the range of the intrinsic viscosity [η] of from 0.5 to 1.0 is preferred.

The rubber-reinforced styrenic resin to be used in the present invention comprises a homopolymer of a styrenic compound and/or a copolymer of a styrenic compound and a compound copolymerizable therewith as a matrix phase, containing a rubbery polymer dispersed in shape of islands. It can be produced by mass polymerization, solution polymerization, mass suspension polymerization or emulsion polymerization of monomers composed mainly of a styrenic compound in the presence of a rubbery polymer either in the presense or absence of a radical polymerization initiator, and is commercially produced, as is well known in the art.

As the rubbery polymer, natural rubber, polybutadiene, butadiene-styrene copolymer rubber, butadiene-acrylonitrile copolymer rubber, ethylenepropylene copolymer rubber and acrylic rubber, etc. may be employed. Polybutadiene and butadiene-styrene copolymer rubber are particularly preferred.

The styrenic compound is a vinyl aromatic monomer represented by the formula

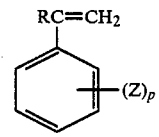

wherein R represents hydrogen atom, a lower alkyl group or a halogen atom, Z represents hydrogen atom, a lower alkyl group, a halogen atom or a vinyl group, p represents 0 or an integer of 1 to 5, such as styrene, α-methylstyrene, β-methylstyrene, vinyltoluene, t-butylstyrene and the like. For preparation of the rubber-reinforced styrenic resin, one or a combination of two or more kinds of these monomers, or a combination of these monomers and vinyl compounds copolymerizable therewith such as methyl methacrylate, acrylonitrile, methacrylonitrile, butyl acrylate, maleic anhydride, etc., may be used. The ratio of the aromatic vinyl compound in a copolymer should preferably exceeed 50 wt. % for the balance with respect to workability and mechanical characteristics. As the rubber-reinforced styrenic resin, the so-called rubber-reinforced polystyrene using styrene as the main component is preferred, since it is commercially produced in a large amount and also it is well miscible with the polyphenylene ether.

The rubber-reinforced styrenic resin may consist of a rubber-reinforced styrenic resin obtained according to the above-described method and a non-reinforced styrenic resin and/or a rubbery polymer or merely a mixture of a non-reinforced styrenic resin and a rubbery polymer, provided that the rubber particle size distribution in the final composition has at least one maximal value at $1.5 \mu$ or less and at least one maximal value at 2 to $3 \mu$ in the volume fraction of the size of rubber particles dispersed in the composition, the ratio of both maximal values is within the range of from $\frac{1}{4}$ to 4/1, and substantially no rubber particles larger than $3 \mu$ exist.

Specific methods for obtaining the composition having the above-described rubber-particle size distribution are described below.

The most general method comprises mixing a blend of rubber-reinforced styrene resins having different rubber particle size distributions with a polyphenylene ether resin. For example, a rubber-reinforced styrene resin in which the maximal in volume fraction of the rubber particle size exists at $1.5 \mu$ or lower prepared by applying a high shearing force during formation of rubber particles and rubber-reinforced styrene resin in which the maximal in the volume fraction of rubber particle size exists at 2 to $3 \mu$ and the number of rubber particles larger than $3 \mu$ is extremely small prepared by uniform and appropriate shearing force during formation of rubber particles are blended at a ratio of $\frac{1}{4}$ to 4/1 in terms of the ratio of both maximal values, and the resultant blend is blended with a polyphenylene ether resin and additives such as flame retardant, etc., by means of a blender, followed by melting and kneading by means of a twin-screw extruder, etc. As another method, a rubber-reinforced styrene resin having a desired rubber particle size distribution can be obtained at a time by process changes with respect to the rubber species and the shearing force, and blended with a polyphenylene ether resin. Also, by using a rubber-reinforced styrene resin in which a maximal value in the volume fraction of rubber particle size exists at 2 to $3 \mu$ and substantially no rubber particles larger than $3 \mu$ exist and a thermoplastic elastomer, they can be melted and kneaded with a polyphenylene ether resin to obtain the specific rubber particle size distribution as described above. Further, by using a rubber-reinforced styrene resin having a maximal value in the volume fraction of the rubber particle size at $1.5 \mu$ or smaller and a rubbery polymer such as polybutadiene, they can be melted and kneaded with a polyphenylene ether resin. Further, by using a non-reinforced styrene resin and two or more kinds of rubbery polymers with different structures or compositions, they can be melted and kneaded with a polyphenylene ether resin to obtain the specific rubber particle size distribution as described above.

In most cases, since the distribution of rubber particles depends on the shearing force during melting and kneading with a polyphenylene ether resin, the rubber particle sizes must be measured in the final composition. The rubber particle size in the composition of the present invention was measured according to the method well known to those skilled in the art. That is, after the present composition was oxidized with $OsO_4$, a ultrathin specimen of 800 to 1000 Å was prepared by microtome and an electron microscope photograph was taken at a magnification of 4000-fold. By using this photograph, the diameters of the rubber particles were determined and sectionalized into the respective sections at every $0.25 \mu$. When the particle size cannot be regarded as a sphere, it was determined as a sphere having a diameter of $\sqrt{ab}$ from the longer diameter a and the shorter diameter b. The frequency fraction of each section was calculated as the volume fraction to prepare a histogram of the volume fractions. For an improvement of the precision of the measured values, several fields of vision were sampled for measurement, and at least 5000 rubber particles were measured. The presence of a maximal value of the volume fraction within the specific particle size range of the present invention indicates that there is a peak showing the maximal value within the range in the above histogram.

In the ratio of the maximal value existing at $1.5 \mu$ or smaller to the maximal value existing at 2 to $3 \mu$, when it is smaller than $\frac{1}{4}$, Izod impact strength and luster depending on the maximal value at $1.5 \mu$ or less will be lowered markedly, and the effect of preventing silver streaks is also poor. On the contrary, when it is larger than 4/1, dart impact strength and chemical resistance will become undesirably poor. Further, the preferable ratio of maximal values is from $\frac{1}{3}$ to 3/1.

The wording, "substantially no rubber particle larger than $3 \mu$ exists" refers to the case that the number of the rubber particles larger than $3 \mu$ as measured by the above-described method does not exceed 0.3%, preferably 0.1%, of the total number of the rubber particles measured. More preferably, the number of the rubber particles larger than $10 \mu$ is 0% of the total number of rubber particles measured and the number of the rubber particles larger than $3 \mu$ and not larger than $10 \mu$ does not exceed 0.1% of the total number of rubber particles measured.

If rubber particles larger than $3 \mu$ exist in a large amount, not only luster is impaired, but silver streaks will be undesirably generated in a large amount.

The composition of the present invention may preferably comprise 10 to 90 parts by weight of a polyphenylene ether resin and 90 to 10 parts by weight of a rubber-reinforced styrenic resin. By formulating thus 10 to 90 parts by weight of a polyphenylene ether resin, both of workability and heat resistance can be preferable. A composition comprising 20 to 80 parts by weight of a polyphenylene ether resin and 80 to 20 parts by weight of a rubber-reinforced styrenic resin is more preferable from the standpoint of the balance between workability and heat resistance. Also, while impact strength and crack resistance become higher as the amount of the rubbery polymer in the resin composition is larger in amount, self-tap characteristic and appearance performance which are important properties during joining of structural members will become contrariwise undesirably lower. Therefore, the content of the rubbery polymer should preferably be within the range from 2.5 to 15%. More preferably, it is within the range from 2.5 to 8%.

The composition of the present invention can be prepared by kneading by means of a kneading machine such as an extruder, heating rolls, a kneader, a Banbury mixer, etc.

It is possible to incorporate other additives such as plasticizers, flame retardants, antioxidants and stabilizers such as UV-ray absorbers or dyes and pigments, as a matter of course. Otherwise, fillers such as glass fibers, carbon fibers, wollastonite, calcium carbonate, talc, mica, etc., can also be added. In addition, other polymers such as polyamide, polyolefin, polyester, etc., can be also mixed in the composition.

The resin composition of the present invention is better in balance of izod impact strength, dart impact strength and more excellent in luster and chemical resistance as compared with the polyphenylene ether resin compositions of the prior art. Further, it is an unexpectedly practically excellent composition with little generation of silver streaks during molding, whereby it can be developed for a wide scope of uses.

EXAMPLES

The present invention is described below by referring to the following examples, by which the present invention should not be construed as limitative. Unless otherwise noted, the resin composition was prepared by kneading a mixture of a polyphenylene ether resin, a rubber-reinforced styrenic resin and other components by means of a twin-screw extruder of 30 mm at about 250° to 300° C. into pellets. The pellets were injection molded into test strips, which were used for measurement of various physical properties according to the following methods.

Izod impact strength;
ASTM D 256

Luster;
the luster at the gate end potion of a dumbbell strip of ASTM D 638 obtained by injection molding was measured at a reflection angle of 60° by means of UGV-4D produced by Suga Shikenki K.K.

Dart impact strength;
a flat plate of 15 cm × 15 cm × 2 mm was prepared by injection molding, and a missile having diameter of ½ R roaded with respective weights was fallen at 23° C. from a certain height and the numerical value for 50% destruction was measured.

Cracking resistance;
an insert member made of brass threaded internally so as to be fitted with M-4 screw (metal screw with 4 mm outer diameter as determined by JIS B 0206) and subjected to knurling on its surface was subjected to insert injection molding at the boss portion, and the boss portion after molding was cut out, immersed in n-heptane at 23° C. for 10 minutes, then taken out and dried. Deep cracks are formed in product having poor crack resistance while there is scarcely formed a crack in the products excellent in crack resistance. For quantifying this to be represented in numerical values, M-4 screw was screwed into the insert member, and the torque value until the boss portion was destroyed was determined by a torque meter. Thus, the product poor in crack resistance is destroyed at a small torque value due to the cracks already formed, while the product excellent in crack resistance has a high value.

Silver streaks;
by means of an injection molding machine IS-45PNV produced by Toshiba Kikai K.K., a resinous composition was made to remain in a cylinder of a molding temperature of 320° C. and was injected at a mold temperature of 80° C., and thus five flat plates of 50×90×2 mm were obtained. Each plate was ranked into 1 to 4 according to the number of silver streaks and an average thereof was calculated for comparison.
Rank 1: No generation of silver streak.
Rank 2: Two or less slight silver streaks are generated.
Rank 3: Three or less slight silver streaks are generated.
Rank 4: Four or more silver streaks or 1 to 3 heavy silver streaks are generated.

EXAMPLE 1

52 parts by weight of a poly(2,6-dimethyl-1,4-phenylene)ether, 43 parts by weight of a rubber-reinforced polystyrene containing 8% of polybutadiene and 5 parts by weight of triphenylphosphate are homogeneously mixed by a blender and kneaded through a twin-screw extruder to obtain pellets. The intrinsic viscosity [$\eta$] of the polyphenylene ether extracted from the pellets according to the method as described before in the present specification is 0.65. The maximal volume fractions of the rubber particle sizes in these pellets existed at 0.4 $\mu$ and 2.4 $\mu$, and the ratio of the maximal values is 7:8, the number of the rubber particles larger than 3 $\mu$ being 0.08% of the total number of the particles measured. The physical properties of this composition are measured to obtain the results as shown in Table 1.

COMPARATIVE EXAMPLE 1

The same composition as Example 1 is obtained, except that the maximal values of the volume fractions of the rubber particle sizes in Example 1 existed at 0.6 $\mu$ and 2.7 $\mu$, the ratio of the maximal values is 6:8 and rubber particles greater than 3 $\mu$ existed in an amount of 40% of the total number of the rubber particles measured, and its physical properties are measured to obtain the results as shown in Table 1.

EXAMPLE 2

31 parts by weight of a poly(2,6-dimethyl-1,4-phenylene)ether, 63 parts by weight of a rubber-reinforced polystyrene containing 11% of polybutadiene and 6 parts by weight of triphenylphosphate are homogeneously mixed by a blender and kneaded through a twin-screw extruder to obtain pellets. The intrinsic viscosity [$\eta$] of the polyphenylene ether extracted from the pellets according to the method as described in the present specification is 0.62. The maximal volume fractions of the rubber particle sizes in these pellets existed at 0.4 $\mu$ and 2.4 $\mu$, and the ratio of the maximal values is 6.5:8.0, the number of the rubber particles larger than 3 $\mu$ being 0.08% of the total number of the particles measured. The physical properties of this composition are measured to obtain the results as shown in Table 1.

COMPARATIVE EXAMPLE 2

The same composition as Example 2 is obtained, except that the maximal values of the volume fractions of the rubber particle sizes in Example 2 existed at 0.6 $\mu$ and 2.7 $\mu$, the ratio of the maximal values is 6:8 and rubber particles larger than 3 $\mu$ existed in an amount of 0.42% of the total number of the rubber particles measured, and its physical properties are measured to obtain the results as shown in Table 1.

EXAMPLE 3

72 parts by weight of a poly(2,6-dimethyl-1,4-phenylene)ether, 18 parts by weight of a rubber-reinforced polystyrene containing 9% of polybutadiene and 10 parts by weight of triphenylphosphate are homogeneously mixed by a blender and kneaded through a twin-screw extruder to obtain pellets. The intrinsic viscosity [η] of the polyphenylene ether extracted from the pellets according to the method as described in the present specification is 0.62. The maximal volume fractions of the rubber particle sizes in these pellets existed at 0.4 μ and 2.4 μ, and the ratio of the maximal values is 7:8, the number of the rubber particles larger than 3 μ being 0.08% of the total number of the particles measured. The physical properties of this composition are measured to obtain the results as shown in Table 1.

COMPARATIVE EXAMPLE 3

The same composition as Example 3 is obtained, except that the maximal values of the volume fractions of the rubber particle sizes in Example 1 existed at 0.6 μ and 2.7 μ, the ratio of the maximal values was 6:8 and rubber particles larger than 3 μ existed in an amount of 0.40% of the total number of the rubber particles measured, and its physical properties are measured to obtain the results as shown in Table 1.

The results of Example 1 are also shown together.

EXAMPLE 5

The same composition as Example 1, is obtained, except that the maximal values of the volume fractions of the rubber particle sizes in Example 1 existed at 0.4 μ and 2.4 μ, the ratio of the maximal values is 6:17 and rubber particles larger than 3 μ existed in an amount of 0.09% of the total number of the rubber particles measured, and its physical properties are measured to obtain the results as shown in Table 2.

COMPARATIVE EXAMPLE 4

The same composition as Example 1is obtained, except that the maximal value of the volume fraction of rubber particle sizes in Example 1 existed only at 0.6 μ, and no rubber particle larger than 3 μ existed at all, and its physical properties are measured to obtain the results as shown in Table 2.

COMPARATIVE EXAMPLE 5

The same composition as Example 1 is obtained, except that the maximal value of the volume fraction of rubber particle size in Example 1 existed only at 2.4 μ, and the number of rubber particles larger than 3 μ is 4.2% of the total number of rubber particles, and its physical properties are measured to obtain the results as shown in Table 2.

TABLE 1

| | | Ex. 1 | Comp. Ex. 1 | Ex. 2 | Comp. Ex. 2 | Ex. 3 | Comp. Ex. 3 |
|---|---|---|---|---|---|---|---|
| Polyphenylene ether resin | [η] | 0.65 | 0.65 | 0.62 | 0.62 | 0.62 | 0.62 |
| Rubber-reinforced polystyrene | Particle sizes at maximal values in volume fraction (μ) | 0.4/2.4 | 0.6/2.7 | 0.4/2.4 | 0.6/2.7 | 0.4/2.4 | 0.6/2.7 |
| | Ratio of maximal values | 7:8 | 6:8 | 6.5:8 | 6:8 | 7:8 | 6:8 |
| | Level of number of rubber particles larger than 3μ (%) | 0.08 | 0.40 | 0.08 | 0.42 | 0.08 | 0.40 |
| | Level of number of rubber particles larger than 10μ (%) | 0.00 | 0.01 | 0.00 | 0.01 | 0.00 | 0.01 |
| Formulation ratio | Polyphenylene ether resin (%) | 52 | 52 | 31 | 31 | 72 | 72 |
| | Rubber-reinforced polystyrene (%) | 43 | 43 | 63 | 63 | 18 | 18 |
| | Other additives (%) | 5 | 5 | 6 | 6 | 10 | 10 |
| Physical properties | Izod impact strength (kgcm/cm) | 9.6 | 7.8 | 12.8 | 12.0 | 11.3 | 9.5 |
| | Luster (%) | 69 | 54 | 69 | 54 | 81 | 70 |
| | Dart impact strength (kg · cm) | 640 | 660 | 750 | 760 | 450 | 460 |
| | Silver streaks | 1.6 | 2.8 | 1.8 | 2.4 | 1.4 | 2.2 |
| | Crack resistance (kg · cm) | 24 | 28 | 24 | 27 | 27 | 29 |

EXAMPLE 4

The same composition as Example 1 is obtained, except that the maximal values of the volume fractions of the rubber particle sizes in Example 1 existed at 0.6 μ and 2.4 μ, the ratio of the maximal values is 9:6 and rubber particles larger than 3 μ existed in an amount of 0.08% of the total number of the rubber particles measured, and its physical properties are measured to obtain the results as shown in Table 2.

COMPARATIVE EXAMPLE 6

The same composition as Example 1 is obtained, except that the maximal value of the volume fraction of rubber particle size in Example 1 existed only at 3.1 μ, and the number of rubber particles larger than 3 μ is 5.5% of the total number of rubber particles, and its physical properties are measured to obtain the results as shown in Table 2.

TABLE 2

| | | Ex. 1 | Ex. 4 | Ex. 5 | Comp. Ex. 4 | Comp. Ex. 5 | Comp. Ex. 6 |
|---|---|---|---|---|---|---|---|
| Polyphenylene ether resin | [η] | 0.65 | 0.65 | 0.65 | 0.65 | 0.65 | 0.65 |
| Rubber-reinforced polystyrene | Particle sizes at maximal values in volume fraction (μ) | 0.4/2.4 | 0.6/2.4 | 0.4/2.4 | 0.6 | 2.4 | 3.1 |
| | Ratio of maximal values | 7:8 | 9:6 | 6:17 | — | — | — |
| | Level of number of rubber particles larger than 3μ (%) | 0.08 | 0.08 | 0.09 | 0 | 4.2 | 5.5 |
| | Level of number of rubber particles larger than 10μ (%) | 0.00 | 0.00 | 0.00 | 0.00 | 0.00 | 0.02 |
| Formulation ratio | Polyphenylene ether resin (%) | 52 | 52 | 52 | 52 | 52 | 52 |
| | Rubber-reinforced polystyrene | 43 | 43 | 43 | 43 | 43 | 43 |

TABLE 2-continued

|  |  | Ex. 1 | Ex. 4 | Ex. 5 | Comp. Ex. 4 | Comp. Ex. 5 | Comp. Ex. 6 |
| --- | --- | --- | --- | --- | --- | --- | --- |
|  | (%) |  |  |  |  |  |  |
|  | Other additives (%) | 5 | 5 | 5 | 5 | 5 | 5 |
| Physical | Izod impact strength (kgcm/cm) | 9.6 | 9.6 | 8.5 | 11.0 | 6.7 | 6.0 |
| properties | Luster (%) | 69 | 69 | 62 | 73 | 61 | 36 |
|  | Dart impact strength (kg · cm) | 640 | 630 | 680 | 430 | 650 | 680 |
|  | Silver streaks | 1.6 | 1.8 | 1.8 | 1.6 | 2.2 | 3.2 |
|  | Crack resistance (kg · cm) | 24 | 27 | 25 | 16 | 15 | 30 |

EXAMPLE 6

The same composition as Example 2 is obtained, except that the maximal values of the volume fractions of the rubber particle sizes in Example 2 existed at 0.6 $\mu$ and 2.4 $\mu$, the ratio of the maximal values is 9:7 and rubber particles larger than 3 $\mu$ existed in an amount of 0.08% of the total number of the rubber particles measured, and its physical properties are measured to obtain the results as shown in Table 3.

The results of Example 2 are also shown together.

EXAMPLE 7

The same composition as Example 2 is obtained, except that the maximal values of the volume fractions of the rubber particle sizes in Example 2 existed at 0.4 $\mu$ and 2.4 $\mu$, the ratio of the maximal values is 6:18 and rubber particles larger than 3 $\mu$ existed in an amount of 0.09% of the total number of the rubber particles measured, and its physical properties are measured to obtain the results as shown in Table 3.

COMPARATIVE EXAMPLE 7

The same composition as Example 2 is obtained, except that the maximal value of the volume fraction of rubber particle size in Example 2 existed only at 2.1 $\mu$, and the number of rubber particles larger than 3 $\mu$ is 3.1% of the total number of rubber particles, and its physical properties are measured to obtain the results as shown in Table 3.

TABLE 3

|  |  | Ex. 2 | Ex. 6 | Ex. 7 | Comp. Ex. 7 |
| --- | --- | --- | --- | --- | --- |
| Polyphenylene ether resin | [$\eta$] | 0.62 | 0.62 | 0.62 | 0.62 |
| Rubber-reinforced polystyrene | Particle sizes at maximal values in volume fraction ($\mu$) | 0.4/2.4 | 0.6/2.4 | 0.4/2.4 | 2.1 |
|  | Ratio of maximal values | 6.5:8 | 9:7 | 6:18 | — |
|  | Level of number of rubber particles larger than 3$\mu$ (%) | 0.08 | 0.08 | 0.09 | 3.1 |
|  | Level of number of rubber particles larger than 10$\mu$ (%) | 0.00 | 0.00 | 0.00 | 0.00 |
| Formulation ratio | Polyphenylene ether resin (%) | 31 | 31 | 31 | 31 |
|  | Rubber-reinforced polystyrene (%) | 63 | 63 | 63 | 63 |
|  | Other additives (%) | 6 | 6 | 6 | 6 |
| Physical properties | Izod impact strength (kgcm/cm) | 12.8 | 10.6 | 10.9 | 7.2 |
|  | Luster (%) | 69 | 65 | 60 | 56 |
|  | Dart impact strength (kg · cm) | 750 | 900 | 800 | 200 |
|  | Silver streaks | 1.8 | 1.8 | 2.0 | 2.0 |
|  | Crack resistance (kg · cm) | 24 | 26 | 26 | 20 |

We claim:

1. A polyphenylene ether resin composition having rubber particles dispersed therein, said composition having been formulated by blending a polyphenylene ether resin with a rubber reinforced styrenic resin, said particles having a distribution of sizes such that there are at least one maximal value at 1.5 $\mu$ or less and at least one maximal value at 2 to 3 $\mu$ in volume fraction of the sizes, with the ratio of the former maximal value to the latter maximal value being within the range of from $\frac{1}{4}$ to 4/1, and substantially no rubber particles having a size larger than 3 $\mu$.

2. A polyphenylene ether resin composition according to claim 1, wherein the polyphenylene ether resin comprises a homopolymer consisting as its constituent unit of the formula [I] shown below or a copolymer consisting of 90 to less than 100 weight parts of the units [I] and up to 10 weight parts of the units of the formula [II] shown below.

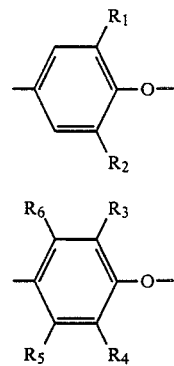

wherein $R_1$, $R_2$, $R_3$, $R_4$, $R_5$ and $R_6$ may be either identical or different and represent mono-valent residues selected from the group consisting of alkyl groups having 1 to 4 carbon atoms except for tert-butyl group, aryl groups, hydroxyalkyl groups, haloalkyl groups, halogen atoms and hydrogen atom, but $R_5$ and $R_6$ are not hydrogen atoms at the same time.

3. A polyphenylene ether resin composition according to claim 2, wherein the polyphenylene ether resin is a homopolymer of the above-described unit [I] or a copolymer of the above-described units [I] and [II] having styrene or a monomer copolymerizable with styrene graft-polymerized thereon.

4. A polyphenylene ether resin composition according to claim 1, wherein the polyphenylene ether resin is a homopolymer of at least one selected from the group consisting of poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)-ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloro-1,4-phenylene)ether, poly(2-methyl-6-hydroxyethyl-1,4-phenylene)ether and poly(2-methyl-6-chloroethyl-1,4-phenylene)ether.

5. A polyphenylene ether resin composition according to claim 1, wherein the polyphenylene ether resin is a copolymer of nucleus-substituted phenols respectively represented by the formulae

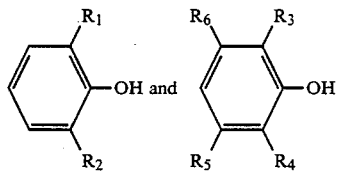

wherein $R_1$, $R_2$, $R_3$, $R_4$, $R_5$ and $R_6$ may be either identical or different and represent are mono-valent residues selected from the group consisting of alkyl groups having 1 to 4 carbon atoms except for tert-butyl group, aryl groups, hydroxyalkyl groups, haloalkyl groups, halogen atoms and hydrogen atom, but $R_5$ and $R_6$ are not hydrogen atoms at the same time.

6. A polyphenylene ether resin composition according to claim 1, wherein the polyphenylene ether resin is a poly(2,6-dimethyl-1,4-phenylene)ether.

7. A polyphenylene ether resin composition according to claim 1, wherein the polyphenylene ether resin is a copolymer of 2,6-dimethyl phenol and 2,3,6-trimethyl phenol.

8. A polyphenylene ether resin composition according to claim 1, wherein the polyphenylene ether resin is a copolymer of 2,6-dimethyl phenol and 2,3,6-trimethyl phenol having styrene graft-polymerized thereon.

9. A polyphenylene ether resin composition according to claim 1, wherein the polyphenylene ether resin is a polymer of 2,6-dimethyl phenol having styrene graft-polymerized thereon.

10. A polyphenylene ether resin composition according to claim 1, wherein the polyphenylene ether resin has an intrinsic viscosity $[\mu]$ of 0.5 to 2.0.

11. A polyphenylene ether resin composition according to claim 6, wherein the polyphenylene ether resin has an intrinsic viscousity $[\mu]$ of 0.5 to 1.0.

12. A polyphenylene ether resin composition according to claim 1, consisting of 10 to 90 parts by weight of a polyphenylene ether resin and 90 to 10 parts by weight of a rubber-reinforced styrenic resin.

13. A polyphenylene ether resin composition according to claim 6, 12 or 1 wherein the number of the rubber particles larger than 3 $\mu$ does not exceed 0.3% of the total number of rubber particles measured.

14. A polyphenylene ether resin composition according to claim 1, wherein the number of the rubber particles larger than 3 $\mu$ does not exceed 0.1% of the total number of rubber particles measured.

15. A polyphenylene ether resin composition according to claim 6 or 1, wherein the number of the rubber particles greater than 10 $\mu$ is 0% of the total number of the rubber particles measured and the number of the rubber particles larger than 3 $\mu$ and smaller than 10 does not exceed 0.1% of the total number of the rubber particles measured.

16. A polyphenylene ether resin composition according to claim 6, 14 or 1, wherein the ratio of the maximal values is within the range of from ⅓ to 3/1.

17. A polyphenylene ether resin composition according to claim 2, wherein the polyphenylene ether resin is a homopolymer of the above-described unit or a copolymer of the above-described units and having styrene and a monomer copolymerizable with styrene graft-polymerized thereon.

* * * * *